No. 865,502. PATENTED SEPT. 10, 1907.
W. H. KISSEL.
APPARATUS FOR TESTING SEEDS.
APPLICATION FILED DEC. 15, 1906.
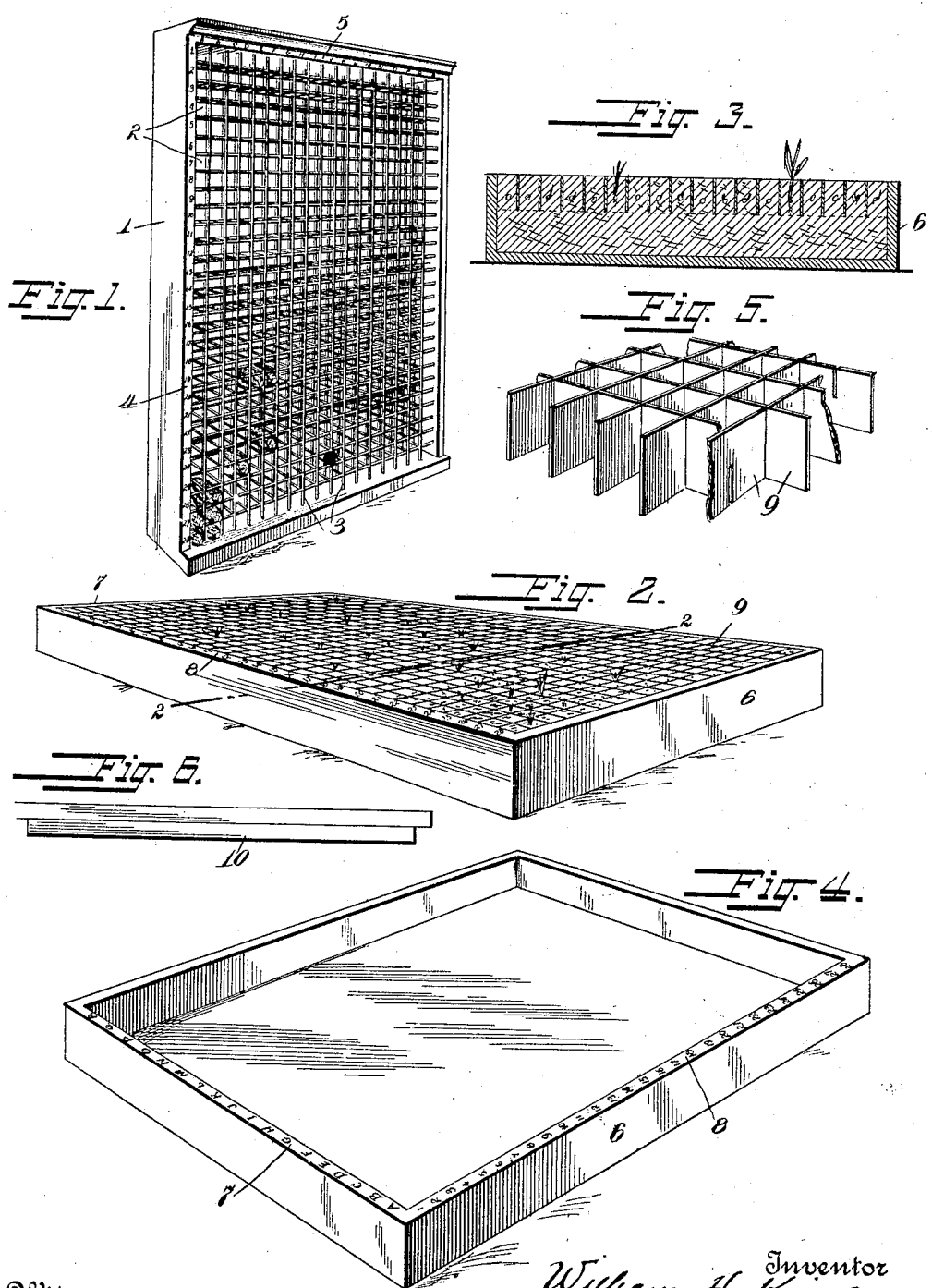
Witnesses
Inventor
William H. Kissel
by
his Attorney

UNITED STATES PATENT OFFICE.

WILLIAM H. KISSEL, OF AVOCA, IOWA.

APPARATUS FOR TESTING SEEDS.

No. 865,502.  Specification of Letters Patent.  Patented Sept. 10, 1907.

Application filed December 15, 1905. Serial No. 291,877.

*To all whom it may concern:*

Be it known that I, WILLIAM H. KISSEL, a citizen of the United States, residing at Avoca, county of Pottawattomie, and State of Iowa, have invented certain new and useful Improvements in Apparatus for Testing Seeds, of which the following is a specification.

This invention relates to an apparatus for testing seeds.

The object of the present invention is the provision of a simple and effective apparatus for testing seed, particularly seed corn, whereby the different seeds are classified or separated so that seed from one source cannot interfere with that from another source and the testing operation carried on with certainty of identification of the seeds, requiring little time and small expenditure in the cost of the improved apparatus employed.

The construction of my improved apparatus is set forth in detail hereinafter, but it is subject to variations of structure, in view of which, I wish it understood that I do not restrict myself to details.

In the accompanying drawings:—Figure 1 represents a classifying cabinet for holding the ears of seed corn; Fig. 2, a perspective view of the seed tester tray and sub-divider, showing the parts as they appear after the seed has been planted and begun to sprout; Fig. 3, a section on line 3—3 of Fig. 2; Fig. 4, a detail of the testing tray; Fig. 5, a detail of the sub-divider; and Fig. 6, a detail of the dirt leveling straight-edge.

A classifying cabinet 1, having pigeon-holes or compartments 2, formed by intersecting horizontal and vertical wires 3, soldered together at their points of intersection, constitutes the classifying cabinet, which is provided with indicia 4 and 5. In the present instance, the indicia 4 are shown of consecutive numerals and the indicia 5 as consecutive letters of the alphabet, but it will be understood that any desired indicia might be employed. In substitution for the classifying cabinet, other means for identifying ears or the seeds from which samples are taken for testing could be used. The compartments might be of wood, and other modifications resorted to.

The seed testing tray 6 is of rectangular shape in the form of a box having an open top, one side being provided with indicia 7, corresponding to the indicia 4, and the other side having indicia 8, corresponding to the indicia 5, thus laying off two sides or top edges of the testing tray into subdivisions corresponding to those of the classifying cabinet.

The sub-divider 9 consists of crossed galvanized strips which are notched where they intersect to effect their engagement with each other, said sub-divider comprising, in its entirety, a number of compartments or pockets corresponding to those of the classifying cabinet, the galvanized strips being so spaced that the indicia 7 and 8 identify the different pockets or compartments of said sub-divider.

The dirt leveling straight-edge 10, shown in Fig. 6, is of such construction that it will properly fit within the seed testing tray.

I wish it understood that many modifications in the construction and arrangement of the seed testing tray and sub-divider can be employed.

In using the apparatus to carry out the seed testing operation or method, dirt is placed in the seed testing tray 6 to a suitable height, according to the dimensions of the parts, and leveled off with the straight-edge 10. The sub-divider 9 is then placed in the tray 6 and pressed into the leveled dirt in said tray to bring the top of the sub-divider level with the top of the tray and prevent any sprout coming up out of its own compartment of the sub-divider. The ears of seed corn are then placed in the pigeon-holes and two or three kernels taken from the respective ears and placed in the corresponding compartments of the sub-divider. When the number of seeds to be tested has been placed in their respective compartments in the sub-divider, dirt is placed upon them in the sub-divider and the straight-edge 10 used to level off the dirt. The seeds to be tested having thus been classified and arranged, it is impossible for a sprout to grow in any other compartment than its own. It can thus be seen which seeds germinate and the corresponding seeds in the classifying compartment are thus indicated so that only the proper seeds or kernels can be planted in the field. Seed corresponding to those which do not grow in the seed tester can be rejected. By the use of my apparatus the grower is insured a large and satisfactory crop.

Having thus described my invention, what I claim as new and desire to secure by Letters Patent, is:—

1. In a seed testing apparatus, a seed testing tray, and a subdividing frame within said tray which has a plurality of independent sprouting or growing compartments, indicia being provided to identify the various compartments aforesaid.

2. In a seed testing apparatus, a seed testing tray, and a removable sub-dividing frame within said tray which has a plurality of independent, circumscribed or defined sprouting or growing compartments, indicia being provided to identify the various compartments aforesaid.

3. In a seed testing apparatus, a rectangular seed testing tray having indicia setting off one of its sides and ends, and a subdividing frame within said tray which has a plurality of independent circumscribed or defined sprouting or growing compartments which are identified by the indicia aforesaid.

4. In a seed testing apparatus, a classifying cabinet having spaces and indicia designating said spaces, a seed testing tray having indicia corresponding to the indicia of the classifying cabinet, and a subdividing frame within the seed testing tray having independent circumscribed or defined identified by the indicia of the seed testing tray.

5. In a seed testing apparatus, a seed testing tray, and a subdividing frame within said tray which has a plurality of independent circumscribed or defined sprouting or growing compartments.

In testimony whereof, I hereunto affix my signature in presence of two witnesses.

WILLIAM H. KISSEL.

Witnesses:
CHAS. SCHMIDT, Jr.,
D. F. EMMERT.